(12) United States Patent
Kliem et al.

(10) Patent No.: US 10,305,730 B2
(45) Date of Patent: May 28, 2019

(54) CONTROL DEVICE FOR CONTROLLING NETWORK NODES, METHOD FOR OPERATING A COMPUTER NETWORK AND COMPUTER NETWORK

(75) Inventors: Daniel Kliem, Hamburg (DE); Martin Wagner, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1059 days.

(21) Appl. No.: 13/399,513

(22) Filed: Feb. 17, 2012

(65) Prior Publication Data

US 2012/0215875 A1 Aug. 23, 2012

Related U.S. Application Data

(60) Provisional application No. 61/444,437, filed on Feb. 18, 2011.

(30) Foreign Application Priority Data

Feb. 18, 2011 (DE) .......................... 10 2011 004 363

(51) Int. Cl.
*G06F 15/16* (2006.01)
*H04L 12/24* (2006.01)

(52) U.S. Cl.
CPC ...... *H04L 41/0806* (2013.01); *H04L 41/0893* (2013.01)

(58) Field of Classification Search
CPC .................. H04L 41/0806; H04L 41/0893
See application file for complete search history.

(56) References Cited

U.S. PATENT DOCUMENTS

| | | | |
|---|---|---|---|
| 4,995,053 A * | 2/1991 | Simpson ............. | H02J 13/0075 375/130 |
| 8,140,826 B2 * | 3/2012 | Archer et al. .................... | 712/2 |
| 8,402,268 B2 * | 3/2013 | Dierickx ................ | B60R 25/04 713/164 |
| 9,215,008 B2 * | 12/2015 | Hastings, Jr. ...... | H04B 7/18504 |

(Continued)

OTHER PUBLICATIONS

N. Moraitis and A. D. Panagopoulos, "Aircraft Attenuation Measurements and Radio Interference Scenarios Between In-Cabin and Terrestrial Cellular Networks," in IEEE Transactions on Aerospace and Electronic Systems, vol. 47, No. 4, pp. 3051-3061, Oct. 2011. doi: 10.1109/TAES.2011.6034688.*

(Continued)

*Primary Examiner* — Kostas J Katsikis
(74) *Attorney, Agent, or Firm* — Jenkins, Wilson, Taylor & Hunt, P.A.

(57) ABSTRACT

The invention relates to a control device for controlling a plurality of network nodes of a computer network, comprising a master computing means for controlling the network nodes in accordance with a program, which master computing means assigns at least one program to each network node, comprising a control logic which is configured to group the network nodes in accordance with the programs assigned to these network nodes in each case and to transmit the same program in parallel to those network nodes of the same group which have been assigned this same program by the master computing means. The invention further relates to a method for operating a computer network and to a computer network.

7 Claims, 2 Drawing Sheets

(56) References Cited

U.S. PATENT DOCUMENTS

| | | | | |
|---|---|---|---|---|
| 2001/0037443 A1* | 11/2001 | Liu | ................. | G06F 9/3867 |
| | | | | 712/200 |
| 2002/0112070 A1 | 8/2002 | Ellerbrock et al. | | |
| 2007/0288935 A1* | 12/2007 | Tannenbaum et al. | ....... | 719/319 |
| 2008/0114937 A1* | 5/2008 | Reid et al. | ................. | 711/117 |
| 2008/0189459 A1* | 8/2008 | Takeuchi | ................. | 710/110 |
| 2009/0077595 A1* | 3/2009 | Sizelove | .............. | G06F 1/1626 |
| | | | | 725/76 |
| 2009/0119655 A1* | 5/2009 | Quilty | .............. | 717/168 |
| 2009/0193270 A1* | 7/2009 | Sajayan | .............. | G06F 12/0862 |
| | | | | 713/300 |
| 2009/0245134 A1* | 10/2009 | Archer | .............. | G06F 9/542 |
| | | | | 370/254 |
| 2010/0142482 A1* | 6/2010 | Lu | .................. | H04B 7/18506 |
| | | | | 370/331 |
| 2010/0189111 A1* | 7/2010 | Muff | ................. | G06F 9/30109 |
| | | | | 370/400 |
| 2010/0281100 A1* | 11/2010 | Benco | .............. | B64D 11/0015 |
| | | | | 709/203 |
| 2011/0116482 A1* | 5/2011 | Ansari | .............. | H04N 21/4122 |
| | | | | 370/338 |
| 2011/0286325 A1* | 11/2011 | Jalali | ................. | H04B 7/18506 |
| | | | | 370/221 |
| 2015/0172116 A1* | 6/2015 | Fischer | ............... | G06F 11/2033 |
| | | | | 370/384 |

OTHER PUBLICATIONS

A. Lewandowski, S. Michaelis, C. Wietfeld, J. Klaue and M. Kubisch, "In-cabin localization solution for optimizing manufacturing and maintenance proces ses for civil aircrafts," Proceedings of the 2012 IEEE/ION Position, Location and Navigation Symposium, Myrtle Beach, SC, 2012, pp. 1257-1264. doi: 10.1109/PLANS.*

German Office action for DE 10 2011 004 363.2 dated Oct. 21, 2011.

German Office Action for Application No. 10 2011 004 363.2 dated Aug. 28, 2015.

Cena, G. [et al.]: Efficient Polling of Devices in CANopen Networks, Published in: Emerging Technologies and Factory Automation, 2003. Proceedings. ETFA | 1'03. IEEE-Conference (vol. 1 ), Date of Conference: Sep. 16-19, 2003, 1 pp. 123-130, URL: http://IIieeexplore.ieee.orglstamplstamp.jsp?tp=&arnumber=124 7697.

* cited by examiner

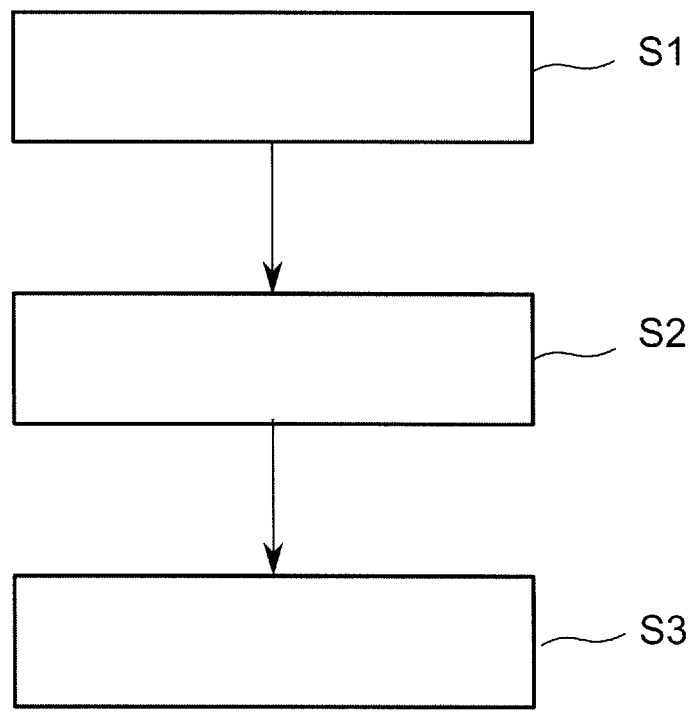

CONTROL DEVICE FOR CONTROLLING NETWORK NODES, METHOD FOR OPERATING A COMPUTER NETWORK AND COMPUTER NETWORK

RELATED APPLICATIONS

The presently disclosed subject matter claims the benefit of U.S. Provisional Patent Application Ser. No. 61/444,437 filed Feb. 18, 2011, and German Patent Application No. 10 2011 004 363.2-31 filed Feb. 18, 2011, the disclosures of which are incorporated herein by reference in their entirety.

FIELD OF THE INVENTION

The invention relates to a control device for controlling a plurality of network nodes of a computer network. The invention further relates to a method for operating a computer network and to a computer network.

TECHNICAL BACKGROUND

The present invention is found in the field of networked systems such as computer networks or bus systems. A computer network is a combination of different technical, primarily stand-alone electronic systems, such as computers, sensors, actuators, functional components, etc., hereinafter referred to in brief as nodes of network nodes, the possibility of central management of nodes of the computer network being of particular importance in this case.

A conventional and advantageous architecture for centrally organised management of the nodes is the so-called master-slave architecture, which is a form of hierarchical management of access to a common resource, such as a memory. In a computer network constructed in a master-slave architecture, one node acts as master and all other node are the slaves. Only the master has the right to access the common resource without being prompted. These masters thus act as control devices for controlling the other network nodes of the same computer network, which operate as slaves. The present invention and the problem on which it is based are described below with reference to a master-slave computer network in an aircraft, without limiting the invention to that effect.

In order to control the slaves in a master-slave computer network, the master produces control commands individually for all slaves which it is to control and transmits these control commands to the corresponding slaves, usually in a fixed time-slot pattern. In most master-slave computer networks, a single master controls all available slaves. A network of this type is also referred to as a single-master network.

In addition to these control tasks for controlling the slaves, a master usually also performs further computing tasks, for example reading in, storing and monitoring sensor data, producing real-time data, etc. The computing load of the master and thus the operability of the master-slave computer network thus depend substantially on the computing power of the master, the computing and control tasks thereof and the number of slaves which must be controlled by the master. This is not critical when there are a low number of slaves. However, it is problematic when the master-slave computer network comprises a plurality of 1000 or more slaves which are each controlled by the same master. Computer networks of this type comprising over 1000 slaves are used, for example, in an aircraft in the cabin networking, such as the cabin lighting, in-flight management, etc. In this case, the computing load of the master increases in accordance with the number of slaves it controls.

A master in an extensive master-slave computer network of this type must, in the time-slot pattern preset for said master, produce the control commands for all the slaves and transmit said control commands to the respective slaves. A very high computational effort by the master is required to produce and transmit the control commands. Depending on priority, the master cannot perform further computing tasks during this time or the slaves are controlled with a correspondingly time delay.

In this case, the computational effort of producing the control commands scales approximately linearly with the number of slaves to be controlled by the master. If a master requires, for example, 5 ms to produce a control command for one slave, the master thus already requires approximately 500 ms to produce the control commands for 100 slaves and even 5 s for 1000 slaves.

If the master of a network does not have sufficient computing resources to perform additional calculations in a preset time in addition to producing the control commands, this inevitably leads to delayed reactions of the master, which causes, for example, loss of comfort when controlling nodes of a computer network in an aircraft.

Therefore, in order still to be able to perform further computing tasks in parallel with the production of the control commands for the slaves, a plurality of computing means are usually used which, for example, perform the necessary calculations independently of the master. However, the use of further computing means increases the complexity and in particular also the cost of a computer network. In addition, the installation effort, the maintenance effort and the associated costs also increase as a result.

SUMMARY OF THE INVENTION

Against this background, an object of the present invention is to reduce the computing load of the master computing means in a master-slave computer network.

According to the invention, this object is achieved by a control device, a computer network and a method having the features disclosed herein.

The following are accordingly provided:

A control device for controlling a plurality of network nodes of a computer network, comprising a master computing means for controlling the network nodes in accordance with a program, which master computing means assigns at least one program to each network node, comprising a control logic which is configured to group the network nodes in accordance with the programs respectively assigned to these network nodes and to transmit the same program in parallel to those network nodes of the same group which have been assigned this same program by the master computing means.

A computer network, in particular a computer network in an aircraft, which network is formed as a master-slave computer network, comprising a plurality of network nodes and comprising a control device according to the invention for controlling the plurality of network nodes.

A method for operating a computer network, comprising the following steps: providing a master computing means and a plurality of network nodes of a computer network; grouping the network nodes which are to be operated using the same program by the master computing means into a respective group of network nodes; transmitting in parallel to the network nodes of the same group a program which is to be transmitted to the same network nodes in each case by the master computing device.

The knowledge on which the present invention is based is that the sequential provision and transmission of the programs for all the network nodes is a very computationally intensive process, in particular when there are a large number of network nodes. The idea on which the present invention is based consists in restructuring the process of producing and transmitting the programs and decoupling said process from the master computing means to the greatest possible extent. In this case, a control logic is provided which is to support the master computing means by taking on in particular the transmission of the programs to the network nodes and thus reducing the load on the master control means, at least in part.

According to the invention, the master computing means produces a series of programs which may contain a plurality of program commands and which are to be transmitted to the network nodes. The master computing means also forms for each node an allocation between the corresponding network node and one of the produced programs. The main computer advantageously produces the programs and allocations when the master or the network is started up.

Based on the allocations, the control logic determines which program corresponds to which network node and groups network nodes which have been assigned the same program into a common group. The control logic then transmits the respective programs to the corresponding groups of network nodes. Since the control logic and not the master computing means now transmits the programs, the computing means is available for further computing processes while the control logic transmits the programs.

According to the invention, the master computing means is provided merely to produce new programs and allocations and store them in the memory in the event that the previous programs and allocations are to be changed. This generally takes place only once, immediately after the master of the computer network is started up. In the case of a program which is to be transmitted to more than one network node, the master computing means only needs to produce this program once and then allocate it to the corresponding network nodes. This further reduces the load on the master computing means. Once the programs and allocations have been produced, the computing resources of the master computing means are not further loaded by the transmission of the programs and can be used for other tasks.

The control logic is in particular formed to transmit programs which are to be allocated to more than one network node to these network nodes in parallel. In this case, the control logic can process the programs in parallel and/or parallelise the actual transmission of the programs via a network. If the individual programs are transmitted in parallel via a network, a program is transmitted only once and in this case is addressed simultaneously to all corresponding network nodes. In this case, the parallel transmission of the programs reduces the load on the control logic, which needs to process programs only once, even when these programs must be transmitted to a plurality of network nodes. In addition, the load on the network is also reduced, since a program which must be transmitted to a plurality of network nodes is merely addressed to a plurality of nodes and is not transmitted physically via the network a plurality of times.

Advantageous embodiments and developments emerge from the dependent claims and from the description with reference to the figures.

In an embodiment, a memory is provided in which the programs allocated to the network nodes, group information of the allocation of the programs to the respective network nodes, and length information about the respective program length are stored. If a separate memory for this information is provided, the control logic can access any components of the programs, the group information, the allocations and the length information at any time and independently of the master computing means. An efficient and independent transmission of the programs to the network nodes by the control logic is made possible as a result.

In a further embodiment, the memory comprises a program memory which is formed to store the programs allocated to the network nodes. The memory further comprises an allocation memory which is formed to store the at least one allocation of the network nodes to a group of network nodes and the program lengths of the respective programs. If the memory is divided into a program memory and an allocation memory, it is possible to store the programs, the group information of the allocations, and the length information in an orderly and structured manner. As a result, the master computing means and the control logic can access this data efficiently.

In a further embodiment, the program memory and the allocation memory are physically arranged in a common memory, for example in a DRAM or SRAM, and are only separated from each other logically, for example as separate storage regions of a common memory address space. In an alternative embodiment to this, the program memory and the allocation memory are designed in a physically separated manner as separate memories.

Typically, but not necessarily, a program assigned to a group of network nodes consists of a number of program commands, the control logic being formed to transmit the number of program commands in succession to the network nodes in accordance with a preset sequence. Dividing a program into a plurality of program commands and transmitting these program commands in a preset sequence to the network nodes makes it possible to configure the individual programs in a flexible manner and thus control the network nodes in a flexible manner.

In a further embodiment, in each case a program counter is provided which continuously determines the number of respectively transmitted program commands of a program. In a further embodiment, the control logic is also formed to stop the transmission of the program to the network nodes if the number, determined by the program counter, of transmitted program commands of this program corresponds to the length information, stored in the allocation memory, of the corresponding program length of this program. This makes it possible for the control logic to control the transmission of the programs to the network nodes precisely, in other words it is always ensured that each command or each instruction of a program has also been transmitted to the network node.

In a further embodiment, a program command comprises at least a single interpretable order and/or at least a single executable instruction. If interpretable orders are transmitted to a network node, a functionality provided on this network node interprets these orders accordingly and responds with a corresponding response on the basis of the respective order. If, on the other hand, executable instructions are transmitted to a network node, then the network node can store these and take on a new functionality on the basis of these instructions. This process is also referred to as flash programming, flash update or even simply update.

In a further embodiment, the control logic is formed to transmit programs once and/or cyclically. If programs are transmitted to the network nodes once, it is possible to execute effectively the programs which, for example, are necessary for starting up a network node, but which are not required during the operation of a network node. By contrast, a cyclic transmission of programs makes it possible to perform a function of a network node repeatedly. If the same program in each case is transmitted a plurality of times for this purpose, memory resources for the repeated storage of the program can be saved.

In an embodiment, more than 100, in particular more than 1000 network nodes are provided, which are connected to the control device via a bus system. The control device according to the invention is thus adapted to requirements of modern computer networks and is very effectively capable of operating the individual network nodes without excessively long delays.

The above configurations and developments can be combined with each other as desired, within reason. Further possible configurations, developments and implementations of the invention also comprise not explicitly mentioned combinations of features of the invention which are described above or below in relation to the embodiments. In particular, the person skilled in the art will also add individual aspects as improvements or supplements to the respective basic form of the present invention.

SUMMARY OF THE DRAWINGS

The present invention is described in detail below with reference to the embodiments given in the schematic figures of the drawings, in which:

FIG. 4 is a flow diagram of a method according to the invention.

Figure 1:
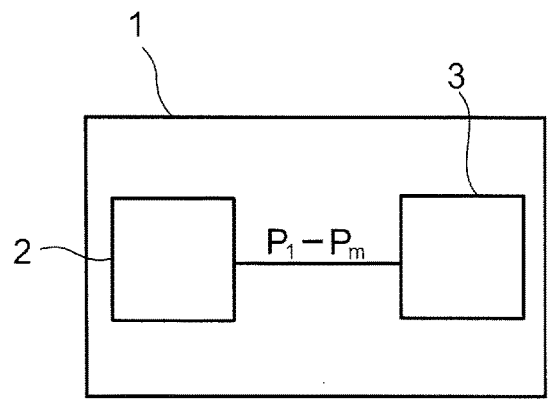
FIG. 1 shows an embodiment of a control device according to the invention.

The appended drawings are intended to facilitate further understanding of the embodiments of the invention. They show embodiments and serve, in connection with the description, to illustrate principles and strategies of the invention. Other embodiments and many of the advantages mentioned emerge with regard to the drawings. The elements of the drawings are not necessarily shown to scale in relation to each other.

In all the figures, like or functionally like elements and devices have been provided with like reference numerals, unless stated otherwise.

DESCRIPTION OF EMBODIMENTS

FIG. 1 shows an embodiment of a control device 1 according to the invention. The control device 1 comprises a master computing means 2 which provides programs $P_1$-$P_m$ for network nodes $T_1$-$T_n$. The control device 1 further comprises a control logic 3 which is coupled to the master computing means 2 and is formed to transmit the programs $P_1$-$P_m$ to the network nodes $T_1$-$T_n$.

The master computing means 2 is formed as a program-controlled means, for example as a microcontroller, microprocessor, digital signal processor or the like, but could also be formed as a programmable logic circuit, such as a PLD or FPGA. In a further embodiment, the master computing means 2 can also be designed as a computer program product component of a computer. The master computing means 2 provides in each case at least one program $P_1$-$P_m$ for a respective network node $T_1$-$T_n$. The master computing means 2 can also provide the same program $P_1$-$P_m$ for more than one network node $T_1$-$T_n$.

In the embodiment shown in FIG. 1, the control logic 3 is formed as an application-specific circuit (ASIC) which receives the programs $P_1$-$P_m$ from the master computing means 2. In a further embodiment, the control logic 3 can also be formed as a PLD, CPLD, FPGA, DSP or the like, The control logic 3 groups the network nodes $T_1$-$T_n$ according to the provided programs $P_1$-$P_m$ and transmits the individual programs $P_1$-$P_m$ to the network nodes $T_1$-$T_n$. If two or more network nodes $T_1$-$T_n$ are grouped in a common group, the control logic 3 transmits a respective program $P_1$-$P_m$ in parallel to the network nodes $T_1$-$T_n$ which are grouped together.

In FIG. 1, the connection between the master computing device 2 and the control logic 3 is designed as a direct parallel digital connection via which the master computing means 2 supplies the programs $P_1$-$P_m$ to the control logic 3. In a further embodiment, the connection can also be designed as a serial digital connection.

Figure 2:
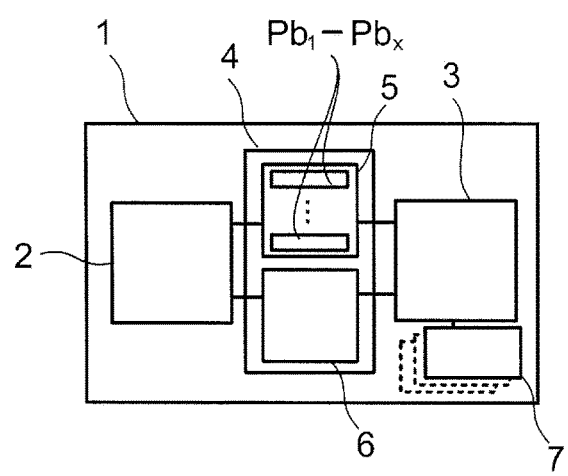
FIG. 2 shows a further embodiment of a control device according to the invention.

FIG. 2 shows a further embodiment of a control device 1 according to the invention. FIG. 2 differs from FIG. 1 in that the connection between the master computing means 2 and the control logic 3 is not a direct point-to-point connection. Instead, a memory 4 is provided which is arranged between the master computing means 2 and the control logic 3 and couples the computing means 2 and the control logic 3 to each other. The memory 4 comprises a program memory 5 and an allocation memory 6. In addition, the control logic 3 in FIG. 2 is coupled to at least one program counter 7. In this case, the program counter 7 is shown by a solid line. Further theoretically possible program counters 7 are shown by dashed lines. The program counter 7 can also be a component of the control logic 3.

The memory 4 in FIG. 2 comprises two separate memories: a program memory 5 and an allocation memory 6. In the embodiment shown in this case, the memory 4 is designed as a parallel random access memory (RAM) which both the master computing means 2 and the control logic 3 can access. In the embodiment shown, the memory 4 consists of two separate memory modules. In an alternative embodiment, the program memory 5 and the allocation memory 6 are provided in a common memory module. In further embodiments, the memory 4 can be provided as at least one serial memory module, for example an I²C memory module or an SPI memory module. It would also be conceivable for the memory 4 to be designed as a hard-disk storage unit, a memory drive, for example a CD drive having write capability, or the like. In these cases, the program memory 5 and the allocation memory 6 are coupled to the memory 4 via an IDE interface, a SATA interface, an eSATA interface, a Firewire interface, a USB interface or the like.

The program memory 5 of the memory 4 in FIG. 2 is formed to store the programs $P_1$-$P_m$ provided by the master computing means 2. The programs $P_1$-$P_m$ consist of individual program commands $Pb_1$-$Pb_x$. In this case, an individual program $P_1$-$P_m$ can consist for example of five program commands $Pb_1$-$Pb_5$ and a second program $P_1$-$P_m$ can consist of 10 program commands $Pb_5$-$Pb_{15}$. In a further embodiment, programs $P_1$-$P_m$ in the memory 4 can also overlap. A first program $P_1$-$P_m$ can for example consist of 15 program commands $Pb_1$-$Pb_{15}$. A second program $P_1$-$P_m$ can in this case form a subprogram $P_1$-$P_m$ of the first program $P_1$-$P_m$, which subprogram consists of the program commands $Pb_5$-$Pb_{10}$.

The at least one program counter 7 in FIG. 2 is shown as an external counter of the control logic 3. In a further embodiment, the program counter 7 is designed as an internal element of the control logic 3 or as a component of the memory 4. In an embodiment, one program counter 7 is provided per group of network nodes $T_1$-$T_n$.

Figure 3:
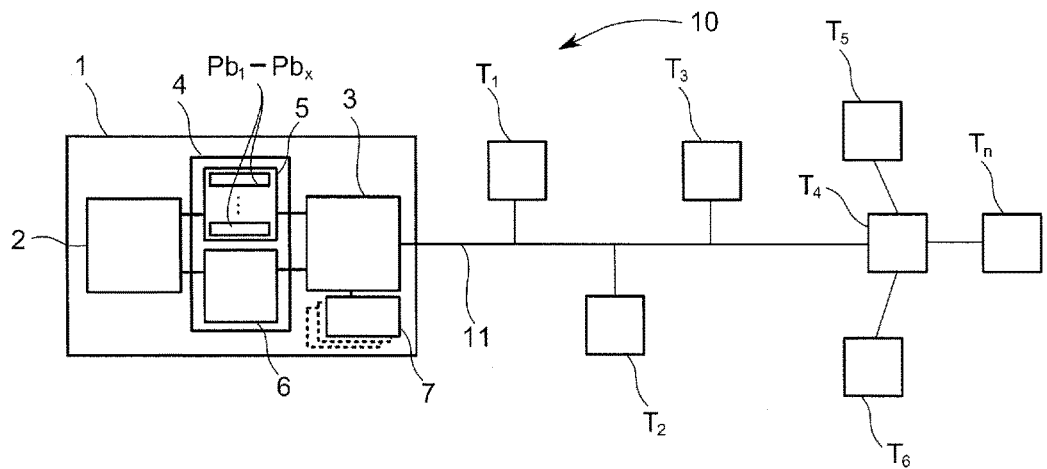
FIG. 3 shows an embodiment of a computer network according to the invention.

FIG. 3 shows an embodiment of a computer network 10 according to the invention. The computer network 10 comprises a control device 1 according to the invention, as shown for example in FIGS. 1 and 2. In this case, the control device 1 is coupled to the network nodes $T_1$-$T_n$ via a network bus 11. Network nodes $T_1$, $T_2$, $T_3$ and $T_4$ are directly coupled to the network bus 11. Network nodes $T_5$, $T_6$ and $T_n$ are coupled to network node $T_4$, which thus takes on the function of a star distributor, also referred to as a hub or switch.

In an embodiment, over 100 network nodes $T_1$-$T_n$ are provided in the computer network 10. In a further embodiment, 1000 or more network nodes $T_1$-$T_n$ are provided in the computer network. In yet another embodiment, more than one control device 1 is provided in the computer network. For example, one control device 1 can control a first set of 1000 network nodes $T_1$-$T_n$ and a second control device 1 can control a second set of 1000 network nodes $T_1$-$T_n$.

In the embodiment shown in FIG. 3, the network bus 11 is formed as an Ethernet network bus. In further embodiments, the network bus 11 is formed as a CAN bus, an ARINC bus, a Profibus or another field bus architecture. The network bus 11 can be formed as an electrical, optical, or wireless or radio network bus, for example as a ZigBee network bus, etc.

FIG. 4 is a flow diagram of a method according to the invention.

In a first step S1, a master computing means 2 and a plurality of network nodes $T_1$-$T_n$ of a computer network 10 are provided.

In a second step S2, the network nodes $T_1$-$T_n$ which are to be operated by the master computing means 2 using the same programs $P_1$-$P_m$ are grouped into a group of network nodes $T_1$-$T_n$ in each case. The control logic 3 groups the network nodes $T_1$-$T_n$ according to the provided programs $P_1$-$P_m$. If an individual program $P_1$-$P_m$ is assigned to two or more network nodes $T_1$-$T_n$, then these network nodes $T_1$-$T_n$ are grouped into a common group by the control logic 3.

In a final step S3 of the method according to the invention, a program $P_1$-$P_m$, which is to be transmitted from the master computing means 2 to the same network nodes $T_1$-$T_n$ in each case, is transmitted in parallel to the network nodes $T_1$-$T_n$ of the same group. In this context, in parallel means that the control logic performs the processing and computing operations for transmitting a program $P_1$-$P_m$ only once for each group. The programs $P_1$-$P_m$ are then transmitted in parallel, in series or in a single message, dependent on the selected network type which connects the network nodes $T_1$-$T_n$ to the control device 1. If the transmission via the network 10 takes place in parallel, a plurality of messages having the same content are transmitted simultaneously to different receivers. If the transmission takes place in series, the messages for the individual network nodes $T_1$-$T_n$ are transmitted in succession on the network 10. If the transmission takes place in a single message, then the one message is addressed to a plurality of network nodes and transmitted once, for example in an IP multicast transmission.

Although the present invention has been described above with reference to preferred embodiments, it is not limited thereto but can be modified in various ways. In particular, the invention can be changed or modified in many different ways without departing from the core of the invention.

The present invention is not limited to the application in the cabin region of a passenger aircraft but can also be used, for example, very advantageously in automation technology, for example in building automation or vehicle automation, in which there are also often more than 1000 slaves per master.

LIST OF REFERENCE NUMERALS 1 control device
2 master computing means
3 control logic
4 memory
5 program memory
6 allocation memory
7 program counter
10 computer network
11 network bus
$P_1$-$P_m$ program
$Pb_1$ program command
$Pb_x$ program command
S1-S3 method step
$T_1$-$T_n$ network node

The invention claimed is:

1. A control device for controlling a plurality of network nodes of a computer network, the control device comprising:
a master computing device configured to control the network nodes in accordance with a program, wherein the master computing device is configured to assign at least one program to each network node, and wherein the computer network is cabin network of an aircraft; and
a control logic which is configured to group the network nodes in accordance with the programs assigned to these network nodes in each case and to transmit the same program in parallel to those network nodes of the same group which have been assigned this same program by the master computing device, and comprising a memory which is arranged between the master computing device and the control logic and in which the programs allocated to the network nodes, group information of the allocation of the programs to the respective network nodes, and length information about the respective program length are stored;
wherein the control logic is configured, for each group of network nodes, to transmit the assigned program for the group of network nodes to the network nodes of the group by transmitting the assigned program on the computer network such that the assigned program is addressed simultaneously to all of the network nodes of the group, wherein transmitting the assigned program on the computer network such that the assigned program is addressed simultaneously to all of the network nodes of the group comprises transmitting the assigned program in a single message in an internet protocol (IP) multicast transmission;
wherein a program assigned to a group of network nodes comprises a number of program commands, the control logic being formed to transmit the number of program commands in succession to the network nodes in accordance with a preset sequence, and wherein a program command comprises at least a single interpretable order and/or at least a single executable instruction;

wherein the memory comprises a parallel random access memory (RAM) and both the master computing device and the control logic are configured to access the parallel RAM, and wherein the parallel RAM comprises a program memory module which is formed to store the programs allocated to the network nodes, and wherein the memory comprises an allocation memory module which is physically separate from the program memory module and which is formed to store the at least one allocation of the network nodes to a group of network nodes and the program lengths of the programs respectively assigned to said network nodes.

2. The control device according to claim 1, wherein in each case a program counter is provided which continuously determines the number of respectively transmitted program commands of a program, and in that the control logic is formed to stop the transmission of the program to the network nodes if the number, determined by the program counter, of transmitted program commands of this program corresponds to the length information, stored in the allocation memory module, of the corresponding program length of this program.

3. A computer network, in particular a computer network in a cabin network of an aircraft, which is formed as a master-slave computer network, the computer network comprising:
a plurality of network nodes, and
a control device for controlling the plurality of network nodes of the computer network, the control device comprising a master computing device configured to control the network nodes in accordance with a program, which master computing device is configured to assign at least one program to each network node, and the control device comprising a control logic which is configured to group the network nodes in accordance with the programs assigned to these network nodes in each case and to transmit the same program in parallel to those network nodes of the same group which have been assigned this same program by the master computing device, wherein a program assigned to a group of network nodes comprises a number of program commands, the control logic being formed to transmit the number of program commands in succession to the network nodes in accordance with a preset sequence, and wherein a program command comprises at least a single interpretable order and/or at least a single executable instruction, wherein the control logic is configured, for each group of network nodes, to transmit the assigned program for the group of network nodes to the network nodes of the group by transmitting the assigned program on the computer network such that the assigned program is addressed simultaneously to all of the network nodes of the group, wherein transmitting the assigned program on the computer network such that the assigned program is addressed simultaneously to all of the network nodes of the group comprises transmitting the assigned program in a single message in an internet protocol (IP) multicast transmission, and
the control device comprising a memory which is arranged between the master computing device and the control logic and in which the programs allocated to the network nodes, group information of the allocation of the programs to the respective network nodes, and length information about the respective program length are stored; and
wherein the memory comprises a parallel random access memory (RAM) and both the master computing device and the control logic are configured to access the parallel RAM, and wherein the parallel RAM comprises a program memory which is formed to store the programs allocated to the network nodes, and wherein the memory comprises an allocation memory module which is physically separate from the program memory module and which is formed to store the at least one allocation of the network nodes to a group of network nodes and the program lengths of the programs respectively assigned to said network nodes.

4. The computer network according to claim 3, wherein more than 100, in particular more than 1000 network nodes are provided, which are connected to the control device via a bus system.

5. The computer network according to claim 3, wherein in each case a program counter is provided which continuously determines the number of respectively transmitted program commands of a program, and in that the control logic is formed to stop the transmission of the program to the network nodes if the number, determined by the program counter, of transmitted program commands of this program corresponds to the length information, stored in the allocation memory module, of the corresponding program length of this program.

6. A method for operating a computer network, the method comprising:
providing a master computing device, and a control logic and a plurality of network nodes of a computer network in a cabin network of an aircraft;
grouping the network nodes which are to be operated using the same program by the control logic into a respective group of network nodes;
transmitting in parallel to the network nodes of the same group a program which is to be transmitted to the same network nodes in each case by the control logic by transmitting the assigned program on the computer network such that the assigned program is addressed simultaneously to all of the network nodes of the group, wherein transmitting the assigned program on the computer network such that the assigned program is addressed simultaneously to all of the network nodes of the group comprises transmitting the assigned program in a single message in an internet protocol (IP) multicast transmission;
storing the programs assigned to the network nodes in a program memory module of a parallel random access memory (RAM) configured for access by both the master computing device and the control logic; and
storing the group information of the allocation of the programs to the respective network nodes and length information about the respective program length in an allocation memory module of the parallel RAM which is physically separate from the program memory module;
wherein a program assigned to a group of network nodes comprises a number of program commands, the control logic being formed to transmit the number of program commands in succession to the network nodes in accordance with a preset sequence, and wherein a program command comprises at least a single interpretable order and/or at least a single executable instruction.

7. The method according claim 6, wherein the number of transmitted program commands of a program is counted, the transmission of the program to the network nodes being stopped if the number, determined by counting, of transmitted program commands of this program corresponds to the stored length information of the corresponding program length of this program.

\* \* \* \* \*